United States Patent
Rodefeld et al.

(10) Patent No.: US 6,234,742 B1
(45) Date of Patent: May 22, 2001

(54) PROCESS AND APPARATUS FOR DECORATING FLAT SELF-SUPPORTING ARTICLES

(75) Inventors: Dietrich Rodefeld, Hilter; Ralf Rudi Redeker, Bielefeld, both of (DE)

(73) Assignee: Werner Kammann Maschinenfabrik GmbH, Bünde (DE)

( * ) Notice: Subject to any disclaimer, the term of this patent is extended or adjusted under 35 U.S.C. 154(b) by 0 days.

(21) Appl. No.: 09/106,663

(22) Filed: Jun. 29, 1998

(30) Foreign Application Priority Data

Jul. 1, 1997 (DE) .................................. 197 28 029

(51) Int. Cl.[7] ........................................ B25J 11/00
(52) U.S. Cl. ........................ 414/771; 414/759; 198/403
(58) Field of Search .................... 414/759, 771; 198/403

(56) References Cited

U.S. PATENT DOCUMENTS

| | | | |
|---|---|---|---|
| 1,812,294 | * 6/1931 | Hohn | 198/403 |
| 2,177,967 | * 10/1939 | Watkins . | |
| 4,533,291 | * 8/1985 | Nishida | 414/759 |
| 4,981,074 | 1/1991 | Machita et al. | 101/35 |
| 5,232,505 | 8/1993 | Novak et al. | 118/712 |
| 5,374,158 | * 12/1994 | Tessier et al. | 414/759 |

FOREIGN PATENT DOCUMENTS

| | | | |
|---|---|---|---|
| 2406979 | 2/1974 | (DE) . | |
| 2410266 | * 9/1975 | (DE) | 414/771 |
| 3540032A1 | 11/1985 | (DE) . | |
| 0398799 | 11/1990 | (EP) | G11B/7/26 |
| 0097972 | * 8/1979 | (JP) | 414/771 |
| 5-277427 | 10/1993 | (JP) | B05C/13/02 |

OTHER PUBLICATIONS

Abraham and Fegley, "Automatic Wafer Transfer and Turnover Tool", Western Electric Technical Digest, Jan. 1978.*

* cited by examiner

Primary Examiner—Robert P. Olszewski
Assistant Examiner—Steven B. McAllister
(74) Attorney, Agent, or Firm—Seidel, Gonda, Lavorgna & Monaco, PC

(57) ABSTRACT

In a process and apparatus for decorating a flat self-supporting article which is turned for decoration thereof on both sides, the article is firstly removed from a horizontal position in an article holder by being lifted by a first pivoting means and then pivoted into a vertical intermediate position from which the article is moved by a second pivoting means producing a pivoting movement of the article into a horizontal position with its previously upward surface facing downwardly. The article is then lowered into an article holder again.

25 Claims, 7 Drawing Sheets

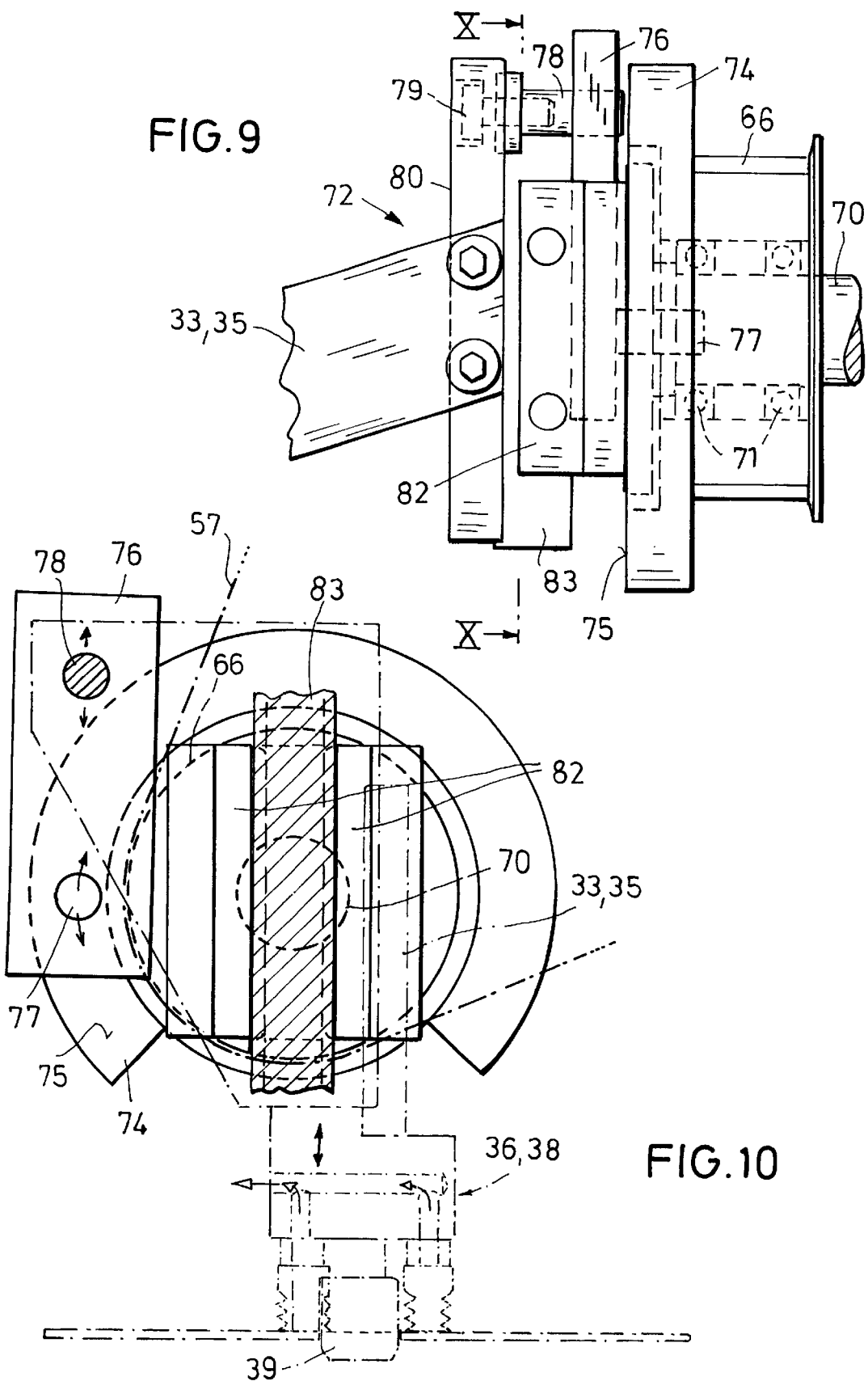

PROCESS AND APPARATUS FOR DECORATING FLAT SELF-SUPPORTING ARTICLES

FIELD OF THE INVENTION

The invention concerns a process and an apparatus for decorating flat self-supporting articles.

It will be noted at this point that the term decorate is used herein in a broad sense to embrace printing for example text on an article, applying graphics to the article, and so forth.

BACKGROUND OF THE INVENTION

There are certain articles and more especially flat self-supporting articles such as CDs that need to be printed upon, on both sides thereof. For reasons of cost the endeavour is for the articles to be printed upon, at both sides, in one pass through the machine. That however generally presupposes that, after printing or decoration of some other kind has been applied to the articles on one side thereof, the articles are turned so that the second side thereof is made accessible to the printing units and possibly also other treatment units, for example driers or the like.

SUMMARY OF THE INVENTION

An object of the present invention is to provide a process for decorating a flat self-supporting article which makes it possible without major difficulty to turn the articles as they pass through the machine, generally through 180° so that the two sides of the article are accessible prior to and after being turned.

Another object of the present invention is to provide a process for decorating a flat self-supporting article which involves an operating procedure such that it can take account of particularities of the article whereby the handling steps involved in turning the article for decoration on the two sides thereof do not result in damage to the article or other consequences such as to adversely affect the properties and qualities of the articlesuch as CDs.

Still another object of the present invention is to provide an apparatus for decorating a flat self-supporting article on both sides thereof, which can reliably provide for turning the article for decoration on respective sides thereof in succession, while being of a reliable and compact structure in terms of the turning arrangement.

Yet a further object of the present invention is to provide an apparatus for decorating flat self-supporting articles at both sides thereof, wherein the article can be satisfactorily and reliably turned between respective procedures for decorating respective sides of an article, without adversely affecting the quality of the article or damaging same.

In accordance with the principles of the present invention the foregoing and other objects are achieved by a process for decorating a flat self-supporting article on respective sides thereof, by picking up an article disposed in a receiving means of an article holder, in an initial or starting position thereof, by virtue of that article being engaged by a first pivoting means adapted to engage the article at a first side thereof by means of a suction effect. The first pivoting means which thus carries the article is moved into an intermediate position by the implementation of a pivotal movement. A second pivoting means is moved into a position for engaging the article in the intermediate position, at the second side of the article which is remote from the first side thereof, the second pivoting means engaging the second side of the article with a suction effect to support the article. After release of the suction effect between the article at the first side thereof and the first pivoting means, the article is then supported by the suction effect of the second pivoting means which pivots into a position for depositing the article held thereby in the receiving means of an article holder.

Further in accordance with the principles of the invention in the apparatus aspect the foregoing and other objects are attained by an apparatus for decorating a flat self-supporting article comprising an article holding means provided with a receiving means for receiving an article to be decorated. The apparatus further includes a turning means including first and second pivoting means, each of which includes a suction means and means for mounting the pivoting means movably between a first position associated with a receiving means for the article and an intermediate position. The respective pivoting means are pivotable in such a way that the article carried by the suction means of the respective pivoting means is pivoted successively by the first and second pivoting means relative to the plane in which the article extends in a receiving means. The first and second pivoting means are arranged in mutually opposite relationship when in the intermediate position in such a way that the article is transferred from the first pivoting means to the second pivoting means by suitable control of the suction means.

As will become apparent from the description hereinafter of a preferred embodiment of the invention, the invention affords the possibility of removing an article from its receiving means of the article holder, after that article has passed through one or more decorating units such as printing units and/or one or more other treatment stations, for the purposes of applying decoration or printing to a first side of the article, then turning the article over and then putting it back into a receiving means. It will be noted here that, if the receiving means is transported forwardly at the same time as the turning operation is implemented, the receiving means which receives the turned article may be identical to the receiving means from which the article had been previously taken prior to being turned. The apparatus which is used to carry out that procedure can be summarised to the effect of being provided with first and second arms which are movable along a curved path and possibly linearly, each arm being provided with a suction means whereby the first arm removes an article from a receiving means and moves it into an intermediate position, in the course of which the article is pivoted to turn it round. At the latest in the intermediate position, the suction means of the second arm is brought into engagement with the second side of the article whereby, after a reduction in or elimination of the suction effect at the suction means of the first arm, the article is engaged by the second arm, more specifically the suction means thereof, and carried thereby in a further pivotal movement, in the course of which the turning operation is completed, to move the turned article into a receiving means. As noted above, that receiving means may be the same receiving means as that from which the article had previously been picked up by the operation of the first arm.

Further objects, features and advantages of the invention will be apparent from the following description of a preferred embodiment thereof.

BRIEF DESCRIPTION OF THE DRAWINGS

FIG. 9 is a view of a part of the FIG. 8 structure on a larger scale, and FIG. 10 is a view approximately in the direction of the arrows X—X in FIG. 5.

DESCRIPTION OF THE PREFERRED EMBODIMENT

Figure 1:
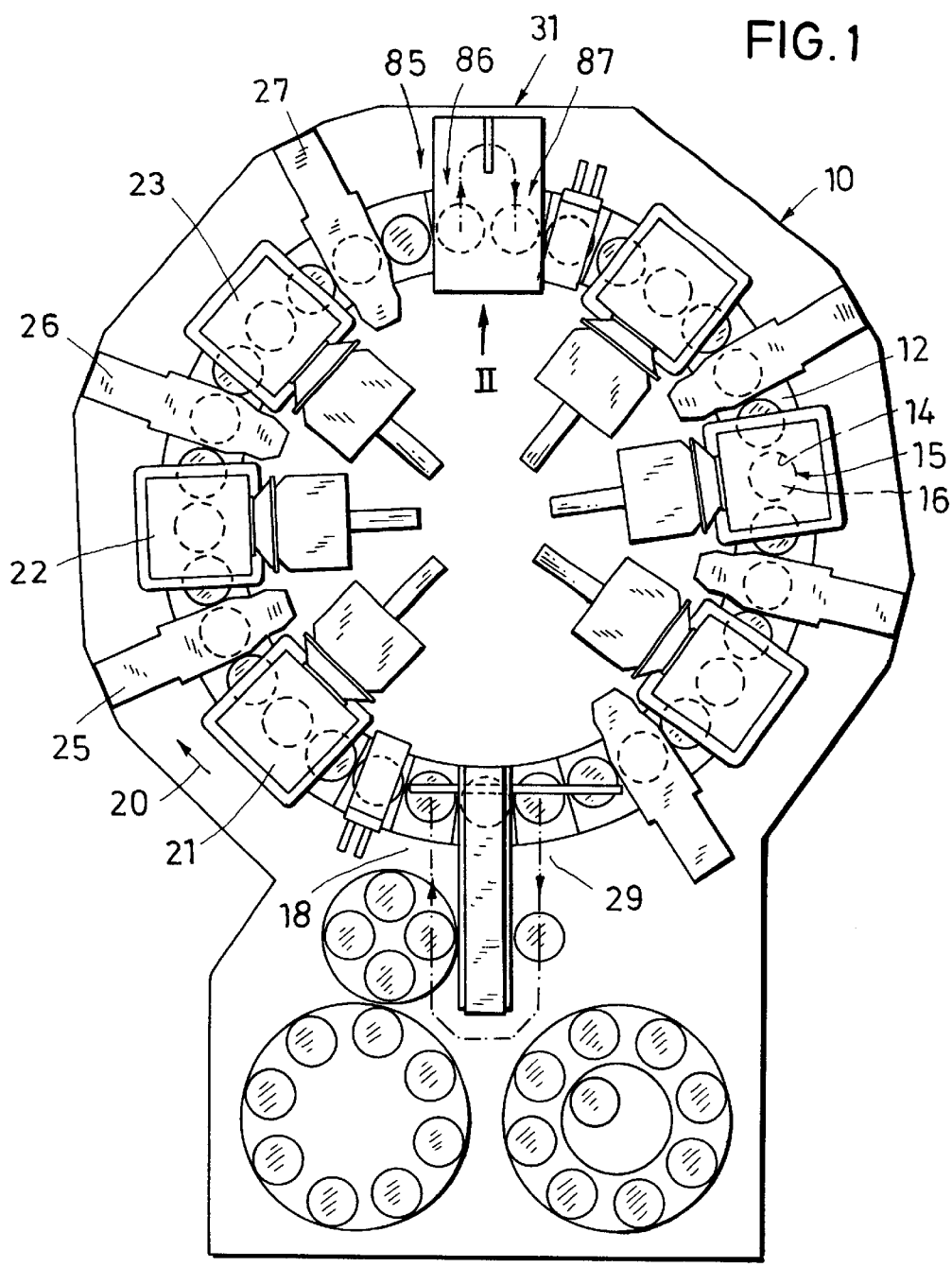
FIG. 1 is a diagrammatic plan view of a screen printing machine incorporating apparatus according to the present invention.

Referring firstly to FIG. 1, shown diagrammatically therein is a screen printing machine 10 provided with a transport table 12 which rotates with a stepwise motion. On the top side the transport table 12 has receiving means indicated by reference numeral 14 in holders 15 for receiving respective articles 16 to be printed upon or decorated. The articles are flat self-supporting articles and are for example CDs.

Reference numeral 18 denotes an entry or feed station at which the respective articles are put into the respective receiving means 14 operatively disposed at the station 18, and the articles are then moved in the direction of the arrow 20 with a stepwise motion along the circular transport path defined by the transport table 12. The articles firstly pass through a plurality of printing stations 21, 22, 23 in which printing is successively applied to the upwardly facing side of the respective articles in the receiving means 14. A drying station 25, 26, 27 is disposed downstream of each respective printing station 21, 22, 23.

After having covered half the transportation distance between the feed station 18 and a discharge station indicated by reference 29 at which the printed articles are removed again from the machine, the articles which have been decorated or printed on a first side are to be turned, that is to say pivoted through 180°, so that the second side thereof which faced downwardly when the article passed through the stations 18 through 27 would then face upwardly and would accordingly be accessible for decoration, printing and the like thereon. That further decorating or printing operation on the second side of the respective article is then effected in printing stations which are disposed in the half of the screen printing machine 10, which is at the right in FIG. 1. The treatment stations in the right-hand side of the machine 10 in FIG. 1 can correspond to those in the left-hand side thereof, although that is not necessarily the case. Accordingly, the turning arrangement for turning the articles 16, as indicated at 31 in FIG. 1, is disposed in the embodiment of FIG. 1 in a region of the transport path defined by the table 12, which is in opposite relationship to the region thereof which includes the entry or feed station 18 and the discharge station 29.

Referring now also to FIGS. 2 through 5 the turning arrangement 31 is provided with first and second pivoting means or units 32, 34, each of which has a respective arm 33 and 35 respectively. At its free end, each arm 33, 35 carries a suction head 36 and 38 respectively. The suction head 36 of the first pivoting means 32 is provided at its front end with a bar portion 39 which can be introduced into a central opening in the article 16, the inside diameter of the opening corresponding to the outside diameter of the bar portion 39 so that the bar portion 39 orients and aligns the article 16 with respect to the frame structure of the machine and holds it in that position as long as the article 16 remains connected to the suction head 36. Each suction head 36, 38 is provided with at least one opening which can be connected to a reduced-pressure source (not shown) by way of suitable connecting means. The specific design configuration of the suction head or the free end of the respective arm 33, 35 having the suction openings is not an aspect of particular significance, as long as the arrangement ensures that the reduced pressure of the reduced-pressure source causes an article 16 to suitably adhere to the suction head of the respective arm 33, 35, by virtue of the suction effect. It will be noted that in the embodiment illustrated in the drawing the suction openings are arranged around the bar portion 39.

Figure 7:
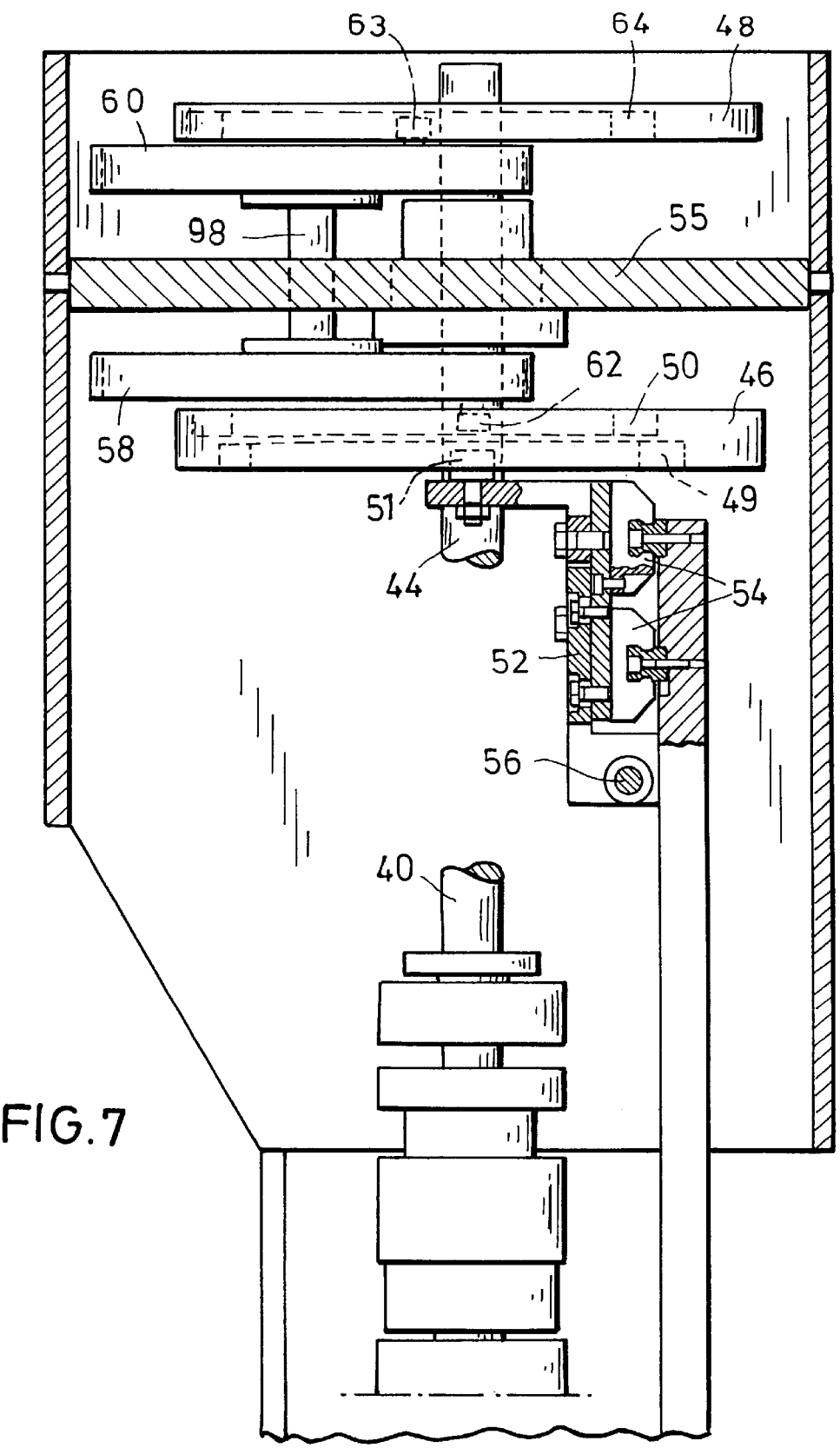
FIG. 7 is a view in the direction of the arrows VII—VII in FIG. 2.

The drive for the first and second pivoting means 32, 34 is derived from a shaft which is indicated at 40 in FIG. 7 and which is driven by the central drive assembly of the machine, which inter alia also provides for the stepwise transportation movement of the transport table 12.

Figure 8:
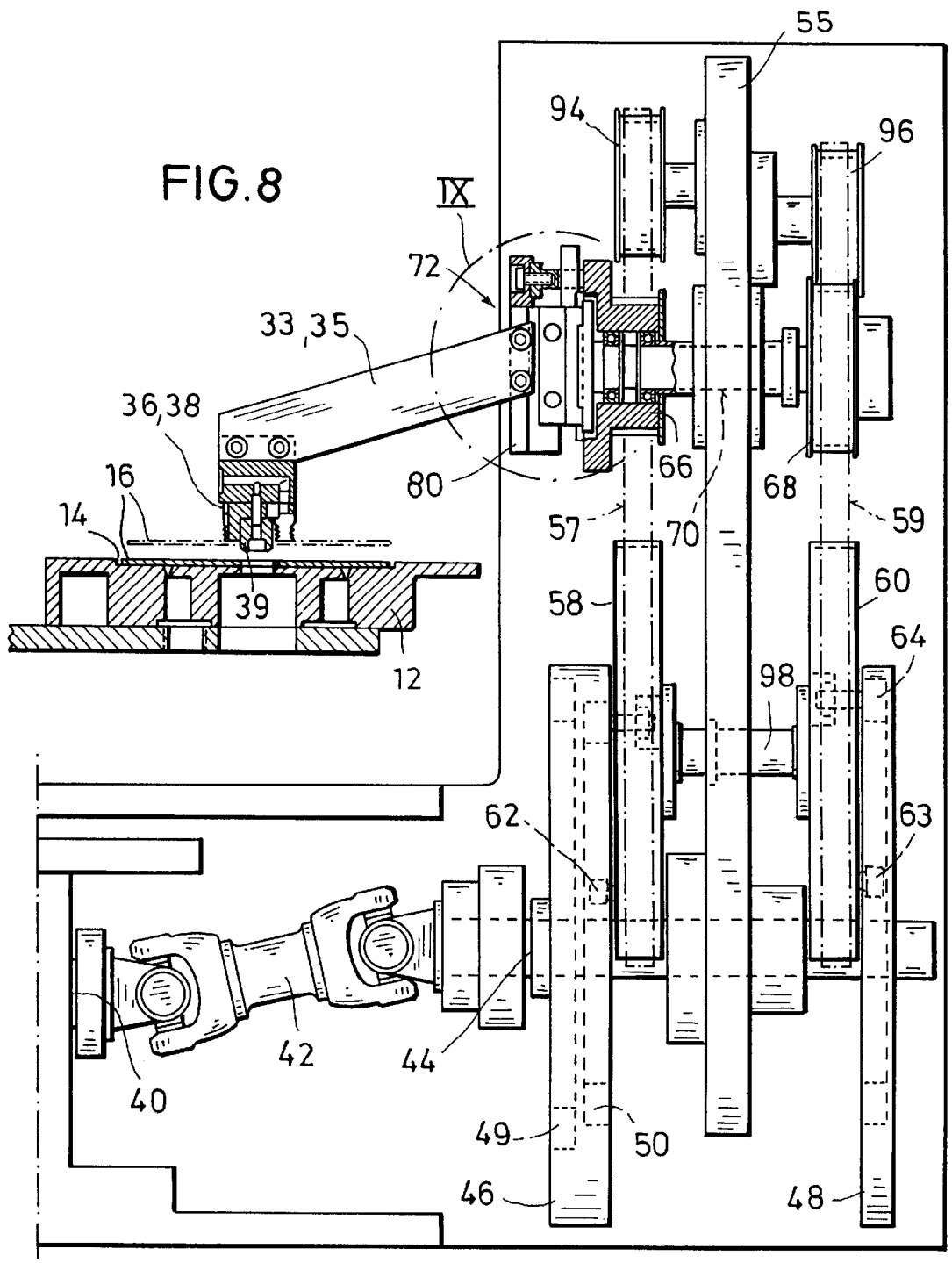
FIG. 8 is a view approximately in the direction of the arrows VIII—VIII in FIG. 2.

As shown in FIG. 8 the shaft 40 is coupled by way of a cardan joint or universal joint 42 to a shaft 44 to which two cam disks 46 and 48 are respectively fixedly connected. The cam disk 46 is visible in FIG. 2, while the other cam disk 48 is disposed therebehind.

The cam disk 46 is provided on each of its two sides with a cam 49 and 50 respectively. Co-operating with the cam 49 is a cam follower roller which is indicated at 51 in FIG. 2 and FIG. 7 and which is carried by a carriage or slider 52 which is mounted displaceably on two mutually parallel vertical guides indicated at 54 in FIG. 2. The slider 52 carries a bar portion 56 which provides for orientation and alignment of the article 16 with respect to the frame structure of the machine and thus with respect to the decorating or printing units carried thereby, after the article has been turned in a manner that is still to be described hereinafter.

A wall indicated at 55 in FIGS. 7 and 8, in which the shaft 44 is rotatably supported, also serves to support an axle 98 on which two gears 58 and 60 are rotatably mounted. Each of the two gears 58, 60 is provided with a respective cam follower roller 62 and 63 respectively of which the cam follower roller 62 co-operates with the cam 50 of the cam disk 46. The cam follower 63 of the gear 60 co-operates with a cam 64 of the second cam disk 48.

Figure 2:
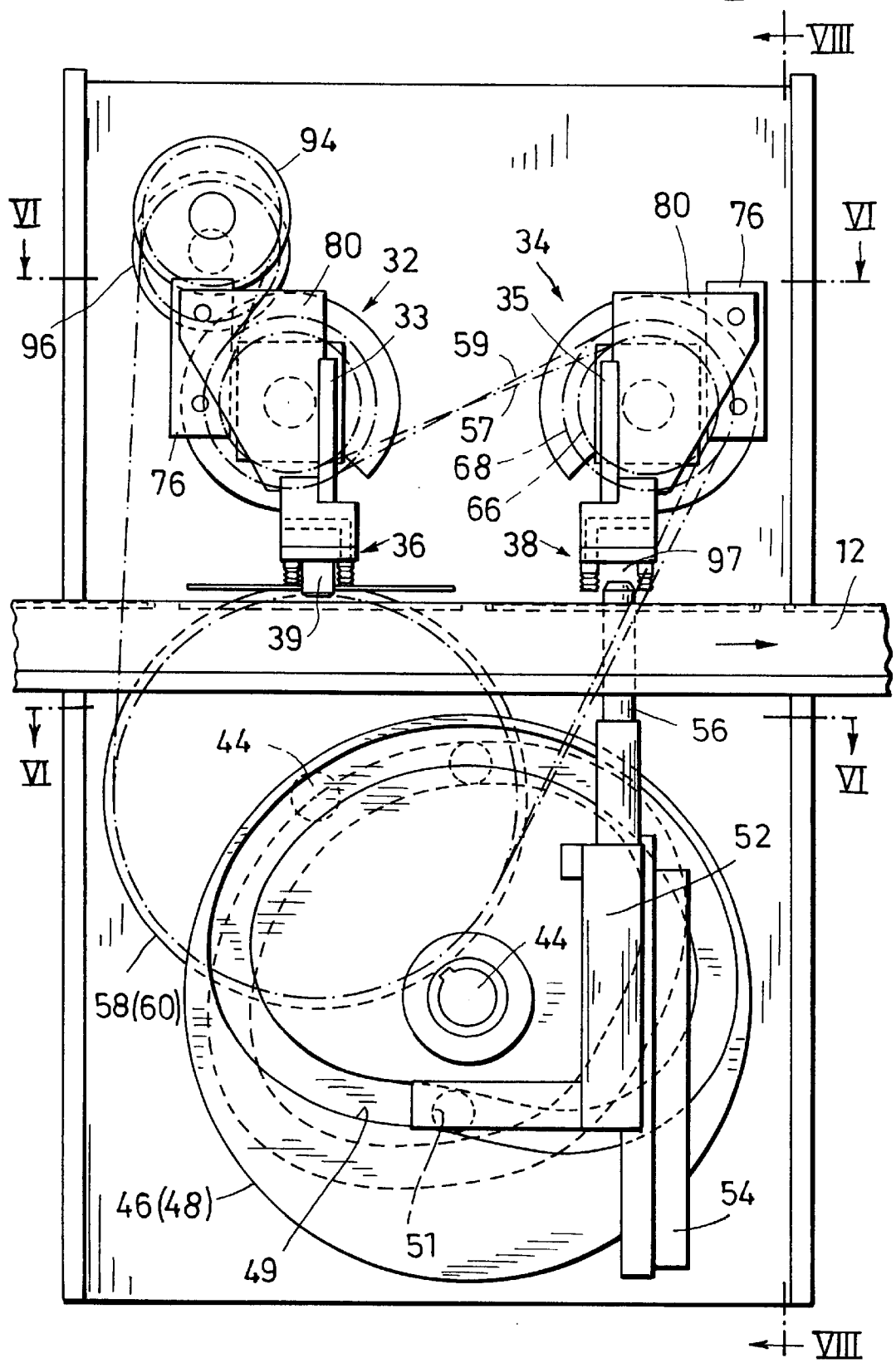
FIG. 2 is a diagrammatic front view of a turning arrangement in the machine, with associated drive and transmission means, FIGS. 3 through 5 each show a view corresponding to FIG. 2 of the actual turning arrangement with the co-operating parts in different positions.

Each of the two gears 58, 60 drives a toothed belt 57 and 59 respectively, which is toothed at both sides and which co-operates with the drive transmission means of the two pivoting means 32 and 34 respectively, as can be seen more particularly from FIG. 2. Associated with each of the two toothed belts 57, 59 is a respective tensioning roller 94 and 96 respectively, serving to guide and set the correct tension in the respective toothed belt 57, 59. Accordingly the tensioning rollers 94 and 96 are also mounted displaceably to the wall 55.

The toothed belt 57 is in engagement with a pinion 66 and the toothed belt 59 is in engagement with a pinion 68 of the pivoting means 32 and 34 respectively in order to rotate same in dependence on the reciprocating movements of the gears 58, 60.

There now follows a description of a pivoting means, in which respect it will be appreciated that this description applies in regard to each of the two pivoting means 32, 34.

Looking at FIG. 8, the pinion 68 is fixed on a shaft 70 which, at an end thereof remote from the pinion 68, carries a holder 72 for mounting a respective arm 33, 35 of the respective pivoting means 32 or 34. A reciprocating movement is transmitted to the two pinions 66 and 68 by the gears 58 and 60 respectively, with the consequence that a correspondingly reciprocating rotational movement of 90° about the axis of the shaft 70 is transmitted to the holder 72 by way of the pinion 68.

The pinion 66 is mounted rotatably on the shaft 70 with the interposition of a suitable bearing assembly illustrated in the form of a rolling bearing assembly 71, and, at its side which is towards the respective arm 33, 35, it is provided with a flange indicated at 74 in FIGS. 9 and 10. A connecting rod 76 is pivotably mounted by means of a pin indicated at 77 in FIGS. 9 and 10 to the face 75 of the flange 74, in eccentric relationship with respect to the shaft 70. At a spacing from the pin 77, as can be clearly seen from FIG. 10, the connecting rod 76 is connected by way of a pin 78 which is also mounted rotatably therein to a plate 80 which in turn carries the respective arm 33, 35. The plate 80 is fixed to the pin 78 by way of a screw bolt indicated at 79 in FIG. 9 which is screwed into the end of the pin 78 which for that purpose is provided with a female screwthread, the screw bolt 79 clamping the plate 80 fast to the pin 78.

At the end of the shaft 70 which is towards the plate 80 the shaft 70 is provided with a radially extending linear guide as indicated at 82 in FIGS. 9 and 10, which participates in the rotary movements of the shaft 70. Secured to the plate 80 which carries the respective pivotal arm 33, 35, at the side towards the linear guide 82, is a rail portion identified by reference 83 in FIG. 10 and which is embraced in positively locking relationship by the linear guide 82 and is longitudinally displaceable relative thereto. The plate 80 is thus carried by the shaft 70 by way of the linear guide 82 and the connecting rod 76.

Figure 3:
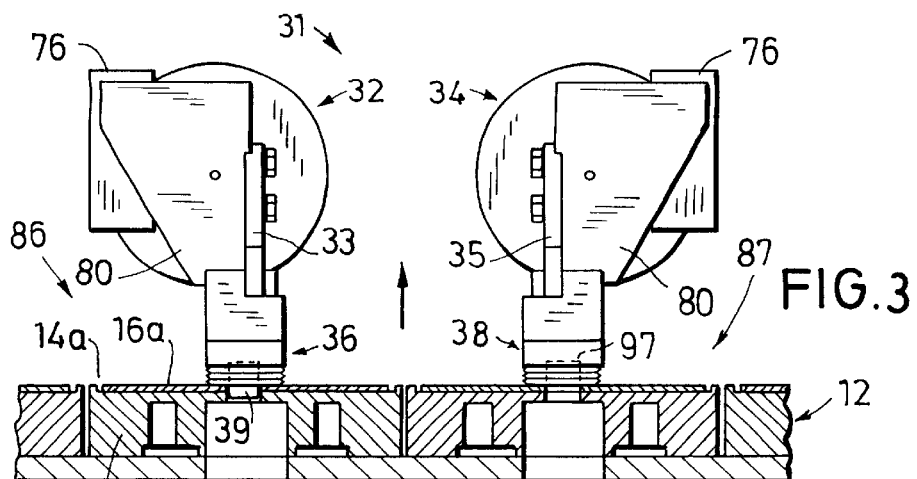
Figure 4:
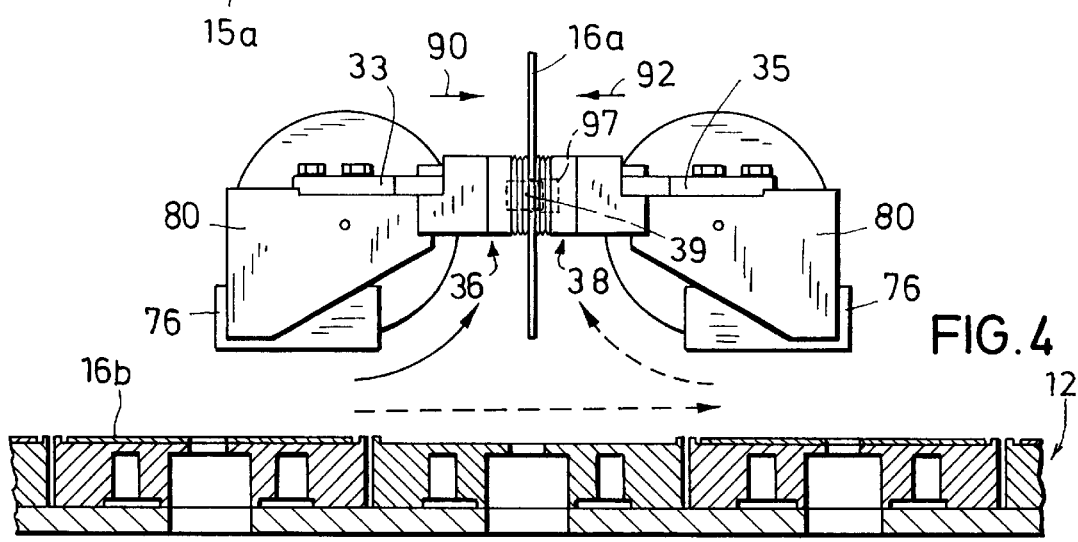
Figure 5:
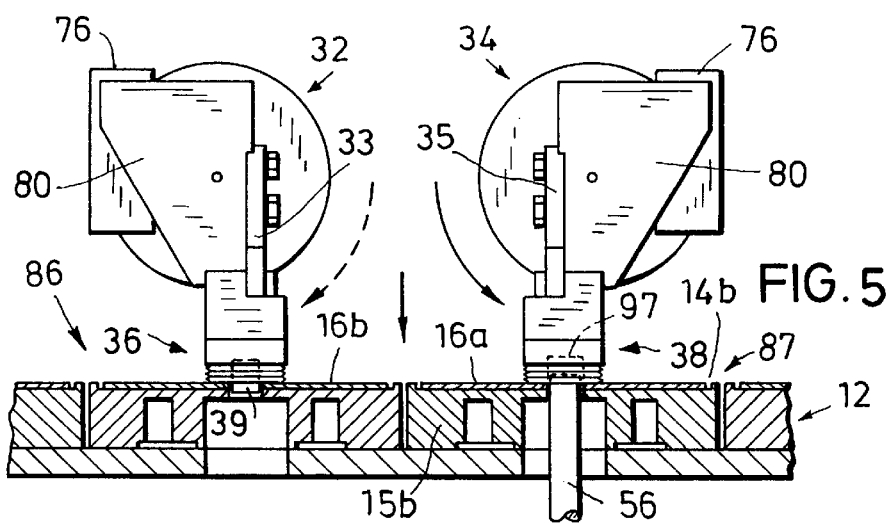
Figure 6:
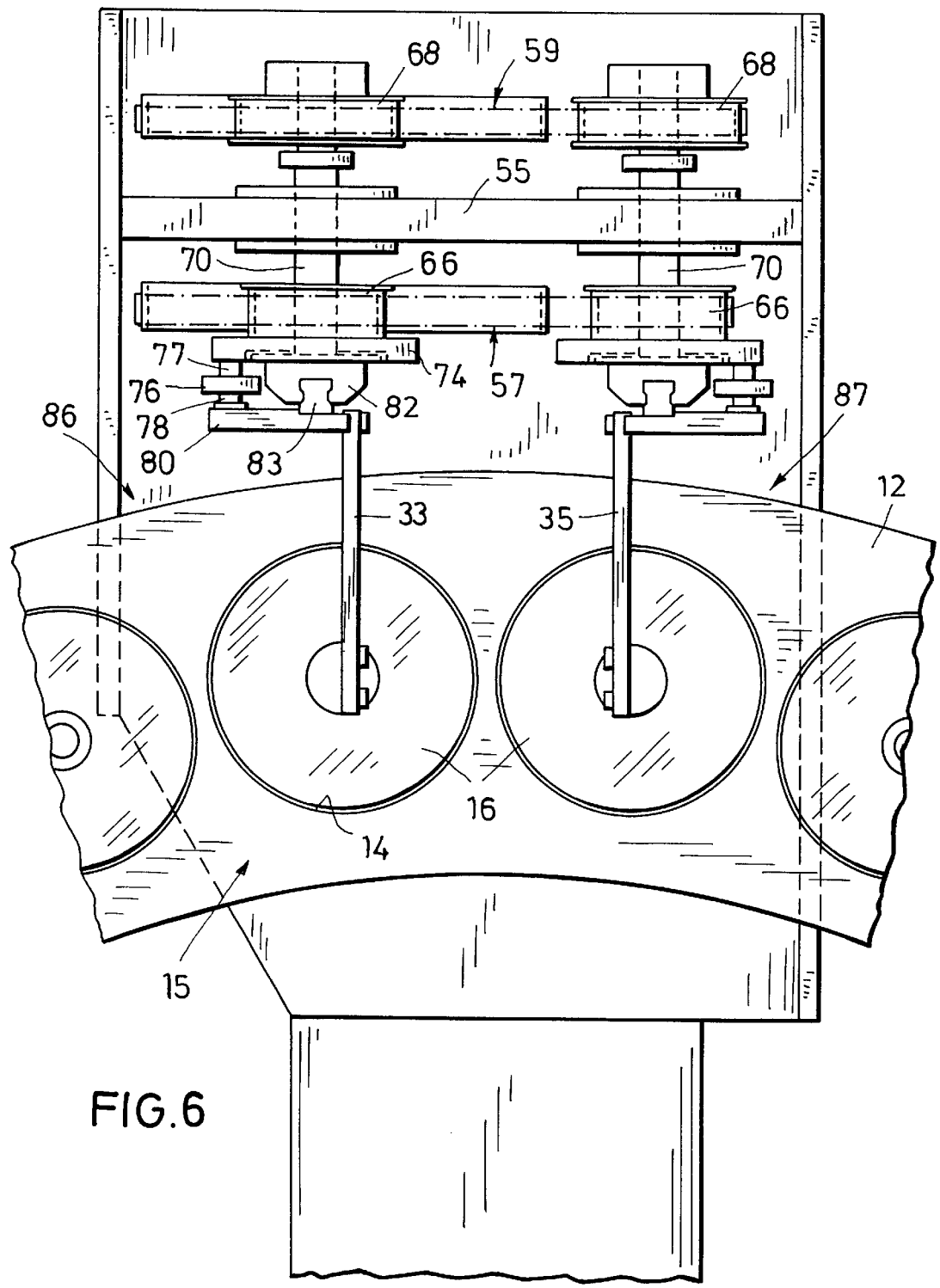
FIG. 6 is a view of a transport table and a part of the associated transmission means viewing in the direction of the arrows VI—VI in FIG. 2.

The two arms 33, 35 are moved by the common drive synchronously but in part in opposite relationship, as can be seen in particular from FIGS. 3 through 5.

Reference will now be made to FIGS. 3 through 5 to describe the operation involved in turning an article 16 in the turning arrangement 31. From the drying station indicated at 27 in FIG. 1 the articles 16 which have been decorated or printed on one side are firstly moved in the next step in the transportation movement of the table 12 into a station 85 in which the decoration or print image applied is checked, in order thereafter in the next step in the transportation movement to move into a station 86 with which is associated the pivoting means 32 of the turning arrangement 31. During the stepping transportation movement the arms 33, 35 of the pivoting means 32, 34 are in a raised position so that they are disposed above the region of movement of the holders 15 with the receiving means 14 carrying their respective articles 16. After the termination of the transportation stepping movement, the two arms 33 and 35 are moved downwardly into positions in which they extend vertically downwardly, thus being the position illustrated in FIG. 3. In that position the suction head 36 of the arm 33 comes to bear against the top surface of the article 16a disposed in the receiving means 14a of the holder 15a, with the bar portion 39 engaging into the central opening in the article 16 so that the latter is properly aligned and oriented or is held in its position of being aligned and oriented relative to the frame structure of the machine. At the latest at that time the reduced pressure in the suction head 36 comes into effect so that, in a subsequent lifting movement of the arms 30 33, 35, the article 16a in the receiving means 14a is firstly moved upwardly out of the receiving means 14a by the arm 33. That is effected by a rotary movement of the respective pinion 66 of the two pivoting means 32, 34, which results in a rotational movement of the flange 74 fixedly connected to the respective pinion 66. That results in corresponding entrainment of the connecting rod 76 which is lifted somewhat and at the same time experiences a slight pivotal movement about the upper pin 78. The extent of the rotational movement performed by the pinions 66 is relatively small and is for example about 20°. The vertically upwardly directed component of movement of the connecting rod 76 necessarily results in a corresponding displacement of the plate 80 which, by virtue of the linear guide arrangement 82, 83 which extends vertically at that time, can only perform a linear movement which causes the above-mentioned lifting motion of the arms 33, 35. In the upward movement of the arm 35, the suction head 38 thereof is not carrying an article so that consequently the reduced pressure at the suction head 38 can be switched off or taken out of action in that phase of the movement. As the article 16a carried by the arm 33 is at a spacing of for example between 10 and 20 mm above the receiving means 14a, the article 16a can be pivoted out of its substantially horizontal position through 90° into a position in which its main plane extends substantially vertically, that is to say parallel to the position illustrated in FIG. 4, without the article 16a hitting against the holder 15a disposed therebeneath, in the course of the pivotal movement. To perform those pivotal movements which are performed by the two arms 33, 35 in opposite relationship, the shaft 70 of each pivoting means 32, 34 is rotated by way of the gear 60 of the common drive assembly and the respective pinion 68, with the result that the above-mentioned pivotal movement of the respective unit formed by the parts 82, 83, 80 and 33 or 35 respectively, with the associated suction head 36 or 38, takes place through an angle of 90° into the position shown in FIG. 4, with the suction head 38 on the arm 35 not carrying any article. Following that pivotal movement, the assembly performs oppositely directed linear horizontal movements of the pivoting means in the direction of the respective arrows indicated at 90 and 92 in FIG. 4, into a central position constituting an intermediate position of the arrangement. Those linear horizontal displacements are again produced by a suitable short rotary movement of the respective pinion 66 which, as the displacement within the linear guide 82 is in the opposite direction to the preceding linear displacement for the purposes of removing the article 16a from the receiving means 14a, is in the opposite direction to the preceding rotary movement. In the position shown in FIG. 4 the suction heads 36, 38 of the two arms 33, 35 bear operatively against the article 16a at respective sides thereof. In that position the bar portion 39 of the suction head 36 engages through the opening in the article 16a into a recess or opening 97 in the suction head 38 so that, irrespective of the suction effect which is respectively effective at that time, the article 16a is held in the position shown in FIG. 4, at any event in positively locking relationship, by the bar portion 39.

At the latest after the position shown in FIG. 4 is reached, the reduced pressure is also caused to take effect at the suction head 38 so that the article 16a is now also held by the suction head 38. It is then possible for the reduced pressure which is operative at the suction head 36 to be at least reduced to such an extent that, in the subsequent movement of the two arms 33, 35 and therewith the suction heads 36 and 38 respectively away from each other, in the direction of the respective arrows 92 and 90, the article 16a adheres to the suction head 38 due to the suction effect and is entrained thereby and is pulled off the bar portion 39 by sliding thereon. At the same time the bar portion 39 comes out of engagement with the opening 97 in the suction head 36. That linear movement of the arms 33, 35 is again produced by suitable actuation of the connecting rods 76 by way of the respective pinion 66.

At the end of the substantially horizontal linear movement which occurs in the direction of the arrows 92 and 90 respectively, or possibly in overlapping relationship therewith, the two arms 33, 35 are pivoted back in opposite directions through 90° into their initial or starting position, with the consequence that the article 16a which has printing or decoration on one side thereof and which is now carried by the head 38 moves again into a horizontal position in which however it is now the second surface thereof which is still to be printed upon or decorated in some other fashion, that faces upwardly, so that, in comparison with the initial position shown in FIG. 3, the article 16a has experienced a pivotal turning movement through a total of 180°. The end of the pivotal movement is then followed by a common vertical downward movement of the arms 33, 35, at the end of which the article 16a carried by the suction head 38 on the arm 35 is disposed in the receiving means 14a from which it had previously been removed by the operation of the suction head 36 of the arm 33. That presupposes that, during the above-described operating procedures during which the article 16a was pivoted through 180°, the transport table 12 with the holders 15 and the receiving means 14 had been advanced by a step in the transportation movement of the table 12.

During the downward movement of the arms 33, 35 the empty suction head 36 of the pivoting means 38 comes to bear against a further article 16b as indicated in FIG. 5, which had moved into the station 86 during the stepping transportation movement of the transport table 12, and which then during the next operating cycle of the process is turned in the manner described above in order in the station 87 to be deposited again in the receiving means 14b of the holder 15b which is then disposed in the station 87.

In the last phase of the downward movement of the arms 33, 35 and thus the suction head 38 with the article 16a held thereto and/or thereafter the centering bar portion indicated at 56 in FIG. 2, which is associated with the station 87 in which the article 16a is fitted into the receiving means 14a again is displaced upwardly into the position shown in FIG. 5 in which the upper end part of the bar portion 56 projects through the central hole in the article 16a. As the outside diameter of the bar portion 56 corresponds to the inside diameter of the central hole in the article 16a, the article 16a is oriented and aligned with respect to the bar portion 56 and therewith also the frame structure of the machine. The bar portion 56 is also of a conically tapering configuration at its free end in order to make it easier for the bar portion 56 to move into and engage in the opening in the article 16a. When the bar portion 56 adopts its upper limit position the bar portion 56 engages into the opening 97 at the end of the suction head 38 as long as the suction head 38 still bears against the article 16a at the upwardly facing surface thereof.

The fact that the movement of the bar portion 56 is derived from the same cam disk 46 as that which also produces the movement of the arm 35 and therewith the suction head 38 downwardly ensures that the movement of the suction head 38 and therewith the article 16a on the one hand and that of the bar portion 56 on the other hand are positively controlled in dependence on each other.

The reduced pressure which acts on the suction head 38 to hold an article thereto can be switched off or reduced as soon as the article 16a has been deposited in the receiving means 14a for accommodating it. In the receiving means 14a, a reduced pressure also acts on the article disposed therein, to hold the article in its position which has been defined by the co-operation between the bar portion 56 and the central hole in the article. The reduced pressure which acts from below on the article in the respective receiving means 14 and which fixes the article in the appropriate position in the receiving means can be switched off in the station 86 so that the article can be lifted out of the receiving means 14 by the arm 33, without difficulty. The reduced pressure can come into effect again in the receiving means in the following station 87 in order to hold the article in the position of being aligned and oriented by the bar portion 56. After the aligning step the bar portion 56 is moved downwardly so that the transport table 12 can perform the next step in the transportation movement.

It will be appreciated that although the turning arrangement 31 in accordance with the invention has been described hereinbefore only in connection with a screen printing machine, it is also possible to use any other suitable decorating or printing process in the same or a similar fashion.

It will be appreciated from the foregoing description that a turning arrangement in accordance with the invention of the configuration described above does not require a large amount of space. The fact that the articles are held to the pivoting arms by a suction means ensures that the articles are handled and manipulated carefully so that the likelihood of damage to the surface in particular thereof is minimised. Because of the relatively small amount of space required for the apparatus, it is also readily feasible for machines which already exist to be subsequently fitted with the turning arrangement according to the invention.

It will be appreciated that the above-described process and apparatus in accordance with the principles of the present invention have been set forth solely by way of example and illustration thereof and that various modifications and alterations may be made therein without thereby departing from the spirit and scope of the invention.

What is claimed is:

1. Apparatus for decorating a flat self-supporting article comprising
an article holding means with a receiving means for an article,
a turning means including first and second pivoting means, each of which comprises a suction means, the first pivoting means including a bar portion adapted to co-operate with the second pivoting means and with an opening in the article for alignment of the article, and
means mounting the pivoting means movably between a first position operatively associated with a receiving means for the article and an intermediate position and pivotably for an article carried by the suction means of the respective pivoting means to be successively pivoted by the first and second pivoting means relative to the plane in which the article extends in a receiving means, the first and second pivoting means being arranged in mutually opposite relationship in the intermediate position in such a way that the article is transferred from the first pivoting means to the second pivoting means by suitable control of the suction means.

2. Apparatus as set forth in claim 1
wherein each pivoting means comprises a carrier element, means rotatably supporting said carrier element, an arm, and means mounting the arm linearly displaceably on the rotatable carrier element, each arm having a free end and at least one suction opening at its free end.

3. Apparatus as set forth in claim 1
wherein the pivoting means are each movable between a position in which the main plane of the article carried thereby extends substantially horizontally and a position in which the main plane of the article extends substantially vertically.

4. Apparatus as set forth in claim 3
wherein the first and second pivoting means are arranged symmetrically.

5. Apparatus as set forth in claim 1 including
a transport means for the articles, said transport means being movable along a path of movement,
wherein the holding means having the receiving means is part of the transport means.

6. Apparatus as set forth in claim 5
wherein the position in which an article is taken from a receiving means by the first pivoting means is different from to the position in which the article is deposited in a receiving means by the second pivoting means.

7. Apparatus as set forth in claim 6 including
means for displacing the holding means with the receiving means from which a said article is removed by the first pivoting means into a second position during the turning movement of the article in such a way that the turned article can be deposited in the same receiving means.

8. Apparatus as set forth in claim 1 comprising
a common drive for the first and second pivoting means.

9. Apparatus as set forth in claim 1 including
in operative association with the receiving means for respectively receiving the turned article a means for aligning the article.

10. Apparatus as set forth in claim 9
wherein the means for aligning the article includes a bar portion and means for moving the bar portion in the direction of its longitudinal axis and adapted to co-operate with an opening in the article for alignment of the article.

11. Apparatus as set forth in claim 10 including a frame structure supporting the appartus and means mounting the bar portion to the frame structure.

12. Apparatus as set forth in claim 1
wherein the second pivoting means includes an opening for engagement of the bar portion therein.

13. Apparatus as set forth in claim 10
wherein the pivoting means includes an opening for engagement of the bar portion therein.

14. Apparatus as set forth in claim 9 including
the means for aligning the article the first and second pivoting means being driven by a common drive.

15. Apparatus as set forth in claim 1 including
a carrier element,
means rotatably mounting the carrier element,
an arm of the pivoting means, and
a linear guide means operatively disposed between the carrier element and the arm.

16. Apparatus as set forth in claim 15 including
a rotatable drive means, and
a connecting rod connecting the arm to the drive means to produce linear movement of the arm.

17. Apparatus for handling flat self-supporting articles, comprising
an article holder including a plurality of article receivers for receiving and supporting an article in an initial position in which a first side of the article is presented,
a first pivotable suction head for contacting an article in an article receiver on the first side of the article, the first pivotable suction head including at least one suction opening for engaging and holding the article bv suction for movement with the first pivotable suction head and an extendible member adapted to co-operate with an opening in the article for alignment thereof,
a second pivotable suction head for contacting the article on a second side thereof remote from the first side, the second pivotable suction head cooperating with the extendible member and including at least one suction opening for engaging and holding the article by suction for movement with the second pivotable suction head,
a driver for causing the first pivotable suction head to pivot and move the held article into an intermediate position and for causing the second pivotable suction head to pivot and move into a position to engage the second side of the article,
a suction controller for removing the suction between the first pivotable suction head and the article after the article is engaged and held by the second pivotable suction head,
the driver being operable to cause the second pivotable suction head to pivot and return the held article to the article receiver in a final position in which the second side of the article is presented.

18. The apparatus set forth in claim 17, wherein the article is disposed substantially horizontally in both the initial position and the final position.

19. The apparatus set forth in claim 17, wherein each of the first and second pivotable suction heads pivots the article through a respective half of the total pivotal movement of the suction heads.

20. The apparatus set forth in claim 17, wherein in the initial position the article is in a first plane and in the intermediate position the article is in a second plane substantially perpendicular plane.

21. The apparatus set forth in claim 17, further comprising means for moving the article holder stepwise along a transport path and means for moving the first and second pivotable section heads along said transport path synchronously with the article holder.

22. The apparatus set forth in claim 17, wherein the driver causes the first and second pivotable suction heads to move synchronously in mirror-image relationship at least over part of an operating cycle.

23. The apparatus set forth in claim 17, wherein the first and second pivotable suction heads are driven jointly.

24. Apparatus for turning over a flat article, comprising
a first suction head for engaging a first side of an article disposed in an initial position in which the first side is presented and holding the article by suction, the first suction head including an extendible member adapted to co-operate with an opening in the article for alignment thereof,
a second suction head cooperating with the extendible member for engaging a second side of the article remote from the first side and holding the article by suction,
a driver for causing the first suction head to move the held article into an intermediate position and for causing the second suction head to move into a position to engage the second side of the article held by the first suction head.

a suction controller for removing the suction between the first suction head and the article after the article is engaged and held by the second suction head, the driver being operable to cause the second suction head to place the held article in a final position in which the second side of the article is presented, the suction controller being operable to remove the suction between the second suction head and the article after the article is in the final position.

25. Apparatus for turning over a flat article, comprising a first suction head for engaging a first side of an article horizontally disposed in an initial position in which the first side faces upward and holding the article by suction, and including an extendible member adapted to co-operate with an opening in the article for alignment thereof, a second suction head cooperating with the extendible member for engaging a second side of the article remote from the first side and holding the article by suction, a driver for causing the first suction head to move the held article into an intermediate position and for causing the second suction head to move into a position to engage the second side of the article held by the first suction head, a suction controller for removing the suction between the first suction head and the article after the article is engaged and held by the second suction head, the driver being operable to cause the second suction head to place the held article in a horizontally disposed final position in which the second side of the article faces upward, the suction controller being operable to remove the suction between the second suction head and the article after the article is in the final position.

* * * * *